Sept. 27, 1932.    C. C. FARMER    1,879,668
SLACK ADJUSTER
Filed Nov. 19, 1927
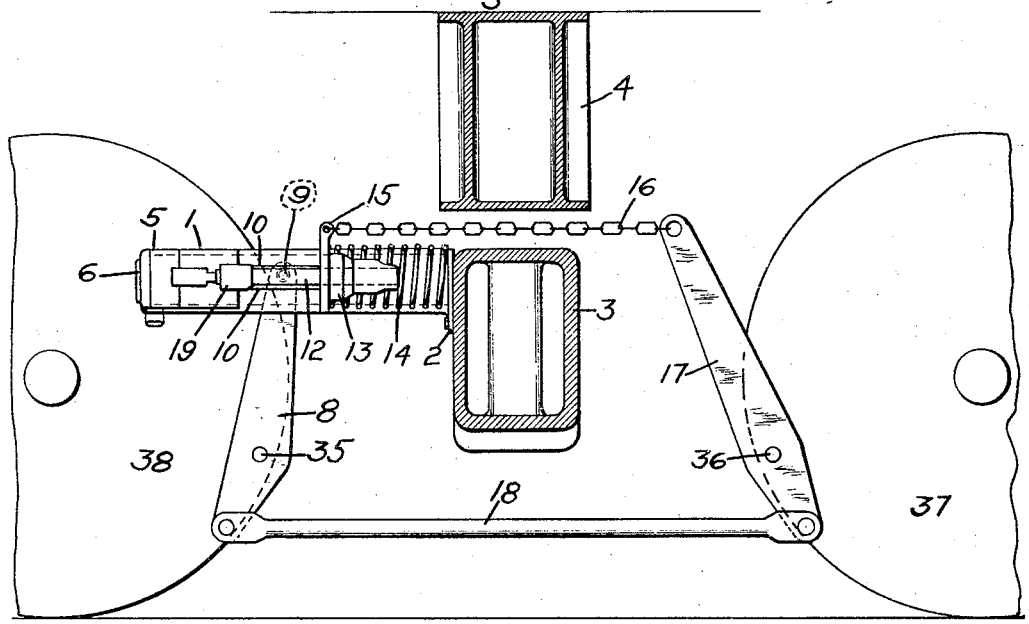
INVENTOR
CLYDE C. FARMER
BY Wm. M. Cody
ATTORNEY Patented Sept. 27, 1932

1,879,668

UNITED STATES PATENT OFFICE

CLYDE C. FARMER, OF PITTSBURGH, PENNSYLVANIA, ASSIGNOR TO THE WESTING-HOUSE AIR BRAKE COMPANY, OF WILMERDING, PENNSYLVANIA, A CORPORATION OF PENNSYLVANIA

SLACK ADJUSTER

Application filed November 19, 1927. Serial No. 234,424.

This invention relates to brake equipment for railway cars, and more particularly to slack adjusters of the pawl and ratchet type.

The principal object of my invention is to provide an improved slack adjuster of the above type.

Another object of my invention is to provide a slack adjuster for railway car brakes which may be easily reset when new brake shoes are applied or for any other reason.

In the accompanying drawing, Fig. 1 is a side elevational view illustrating the manner in which my slack adjuster may be applied to a railway car, the truck bolster and body bolster being shown in section; Fig. 2 is an enlarged view, partly in horizontal section, of the slack adjuster shown in Fig. 1; Figs. 3 and 4 are cross sectional views taken on the lines 3—3 and 4—4 respectively of Fig. 2; and Fig. 5 is a fragmentary view showing a modified form of the releasing mechanism.

As shown in the accompanying drawing, the slack adjuster may comprise a casing 1, preferably having an end flange 2 which is secured to the truck bolster 3 or any other desired cross member of the car truck. Above the truck bolster, and supported by this truck bolster, through the medium of the usual truck and body center bearings (not shown), is a body bolster 4 which is part of the underframe of a car body, the distance between these bolsters being that usually provided in car construction.

The casing 1 of the slack adjuster preferably comprises a hollow rectangular portion 5 which extends outwardly from one side of the truck bolster, in a direction longitudinally of the truck, and contains a toothed ratchet bar 6 which is movable relative to the casing 1 and is adapted to be projected through an opening formed in the end of the portion 5.

Formed in the ratchet bar 6, is a cruciform opening 7 into which the upper end portion of a dead brake lever 8 extends. The opening is made this shape so as to accommodate aligned fulcrum members 9 on the upper end of the dead lever, and to provide shoulders or abutments with which the members 9 engage to fulcrum the lever. In the present embodiment of the invention the members 9 are formed by passing a pin through an opening formed in the lever. The opening 7 preferably extends transversely through the ratchet bar 6, and the upper portion of the dead lever is loosely mounted therein, so that, any movement of the casing 1 and the ratchet bar, in the direction of the length of the lever 8, caused by the usual vertical up and down movement of the bolster 3, will not be transmitted to the lever. In service there will be a substantially continuous up and down movement of the ratchet bar relative to the lever 8, and to reduce the friction between the lever and the bar, the fulcrum members 9 may be provided with rollers 43 adapted to engage with the bar. It will be understood however that if desired these rollers may be omitted.

Extending outwardly from one of the side walls of the portion 5 are spaced flanges 10 which, intermediate the ends of the portion 5, are connected with a lug 11 also extending outwardly from said wall, said lug having an opening therethrough for the reception of an adjusting member 12 preferably in the form of a tube, and this member is so mounted in the lug 11 so that it is movable relative thereto. Secured to the rear end of the member 12 is a spring seat 13 and interposed between this seat and the flange 2, is a spring 14 which, at all times tends to urge the member 12 forward. The spring seat 13 has an upwardly extending perforated lug 15 to which one end of a chain 16 is attached, the opposite end of said chain being attached to the upper end of a live brake lever 17. The lower end of this live lever 17 and the lower end of the dead lever 8 are connected through the medium of a brake connecting rod 18.

Secured to the forward end of the member 12 is a take-up pawl head 19 having spaced perforated lugs 20 between which a take-up pawl 21 is pivotally mounted on a pin 22, the ends of which extend through and beyond the spaced lugs 20, and are slidably mounted in slots 23 formed in the flanges 10, and thus support the head and associated parts.

The pawl 21 is provided with an arm 24 which extends through an opening formed in the adjacent side wall of the portion 5 and is adapted to engage the teeth 25 of the ratchet bar 6, and is further provided with an arm 26 which is adapted to be engaged by a spring actuated plunger 27 for tending, at all times, to urge the arm 24 into engagement with the teeth 25.

Adjacent the take-up pawl 21, and between the flanges 10, there is a holding pawl 28 pivotally mounted on a pin 29, the ends of which extend through and beyond the flanges 10, and pivotally mounted on these projecting ends of the pin, are spaced end portions of a pawl operating lever 30 which is adapted to loosely engage a projection 31 extending from each side of the holding pawl 28. The forward end of this pawl 28 extends through the opening in the side wall of the portion 5 and is adapted to engage the teeth 25 of the ratchet bar 6, and for, at all times, tending to urge the pawl into engagement with said teeth, a spring 39 is provided which is interposed between the wall of the portion 5 and an arm 32 extending to the right of the pivot pin 29.

The arm 24 of the take-up pawl 21 extends between the spaced portions of the pawl operating lever 30 and beyond this arm the lever is made solid, and at one side is adapted to be engaged by the pawl 21 and at the opposite side is adapted to be engaged by a lever 33 which is pivotally mounted in the casing 1, adjacent the end of the portion 5, and is operative through the medium of a lever 34. As shown in Fig. 5 of the drawing, a cam member 42 may be substituted for the lever 33 for operating the lever 30.

The brake levers 8 and 17 are adapted to be operatively secured to the usual brake beam which carries the usual brake heads and shoes, at the points 35 and 36 respectively.

In the drawing the brake levers are shown disposed vertically and the slack adjusting mechanism positioned to suit, and this has been done to more clearly illustrate the invention, but I am aware that these levers are usually disposed at an angle and in such cases the slack adjusting mechanism would be disposed at an angle to that shown.

In operation, when the brakes are applied, the upper end of the live lever 17 is pulled to the right until the brake shoes engage the car wheels 37, when the lever turns about the fulcrum point 36 and shifts the connecting rod 18 to the left, until the brake shoes engage the car wheels 38, the upper end of the lever 8 acting as a fulcrum and tending to move the ratchet bar toward the right, but the engagement of the holding pawl 28 in the ratchet teeth 25 prevents such movement.

If the brake cylinder piston travel on the car does not exceed a predetermined amount in applying the brakes, the slack in the chain 16 is merely taken up and the movement of the upper end of the lever 17, to the right, will not be sufficient to cause the chain 16 to pull and move the adjusting member 12.

If the brake cylinder piston travel on the car should exceed a predetermined amount, the chain 16 is pulled toward the right a sufficient distance as to cause the spring seat 13, adjusting member 12 and head 19 to move toward the right, against the pressure of the coil spring 14. As the head 19 thus moves to the right, the take-up pawl 21, which is pivotally connected to the head, also moves to the right, so that the arm 24 rides out of engagement with one of the teeth 25 of the ratchet bar, the spring actuated plunger 27, however, acting on the arm 26 of the pawl to maintain the arm 24 in contact with the teeth 25. Should the pawl 21 be moved a greater distance than the space between two adjacent teeth on the ratchet bar, the spring actuated plunger 27 acting on the arm 26 causes the arm 24 to engage the ratchet bar one tooth to the right of the tooth it had previously engaged. During this movement of the take-up pawl 21, the ratchet bar is held against movement to the right, by engagement of the holding pawl 28 with the teeth 25.

When the brakes are released, and the upper end of the live lever 17 returns to its normal position, the pressure of the spring 14 causes the spring seat, member 12, head 19 and take-up pawl 21 to move to the left, and as the arm 24 of this pawl is in engagement with one of the teeth 25, the ratchet bar 6 will be caused to move to the left a distance equal to the distance between two adjacent teeth, thus moving the fulcrum point of the upper end of the dead lever 8 the same distance to the left. The holding pawl 28 does not interfere with this movement of the ratchet bar to the left, and as said bar moves in this direction, the pawl 28 rides out of engagement with the tooth 25 it had been previously engaged with, and is moved, by the action of the spring 39 on the arm 32, into engagement with the next tooth to the right. In this manner excess piston travel is taken up step by step and thus the piston travel is held within narrow limits.

When the pawl 21 is in its normal extended position as shown in the drawing, the arm 24 is overlapped by an inwardly extending lug 40 formed on the casing, there being clearance between the lug and the arm which is less than the depth of the teeth 25, so that, if at any time, there should be a tendency for the arm 24 to be accidentally moved out of engagement with a tooth 25, such movement will be stopped by the arm engaging the lug before it can move a distance equal to the depth of a tooth 25. In service a railway car is subjected to heavy shocks, particularly end shocks, and due to these shocks the bar 6 will have a tendency to move to the left, causing the arm 24 of the pawl 21 to be moved into engagement with the lug 40 before it can ride out of engagement with a tooth 25, thus maintaining the bar 6 in its adjusted position. If the bar 6 could be accidentally moved to the left, the needed slack in the brake would be prematurely taken up. It will thus be seen that the pawl 21 must be moved toward the right before the arm 24 will be moved out of engagement with a tooth.

When it is desired to reset the slack adjuster, the lever 34 is moved either forward or backward, which causes the lever arm 33 to rotate into engagement with the outer end portion of the lever 30, causing said lever 30 to move inwardly. As the lever 30 is thus moved, it engages the projections 31 on the pawl 28 and moves the pawl out of engagement with the teeth 25 of the ratchet bar. At the same time the outer end portion of the lever 30, which is in contact with the pawl 21, moves said pawl, together with the head 19, member 12, and spring seat 13, to the right against the pressure of the spring 14, a sufficient distance that the arm 34 will be out of engagement with the teeth 25 of the ratchet bar. When the take-up and holding pawls are free of the teeth 25 the ratchet bar can be moved to its proper position. The ends 41 of the lever 33 are made flat so that if the arm 34 is rotated far enough either one of these ends 41 will engage the lever 30 and will lock the pawls 21 and 28 out of engagement with the adjusting bar 6, thus rendering the resetting of the bar 6 comparatively easy.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a truck bolster and a plurality of operatively connected brake levers, of an automatic slack adjuster comprising a casing mounted on said bolster, a member movably mounted in said casing and operatively connected with one of said levers, means operatively connected with another of said levers for adjusting said member to take up slack, and means with which the first mentioned means is adapted to cooperate to prevent said member from moving from its adjusted position.

2. The combination with a truck bolster and a plurality of operatively connected brake levers, of an automatic slack adjuster comprising a casing mounted on said bolster, a member movably mounted in said casing and operatively connected with one of said levers, means operatively connected with another of said levers for adjusting said member to take up slack, and a lug on said casing with which the first mentioned means is adapted to cooperate to prevent said member from moving from its adjusted position.

3. The combination with a truck bolster and a plurality of connected brake levers, of an automatic slack adjuster comprising a casing mounted on said bolster, a toothed member mounted in said casing and operatively connected with one of said levers, a pawl adapted to engage the teeth of said member and operative to move said member forward to take up slack, and means whereby said pawl in its forward position will prevent accidental forward movement of said toothed member.

4. The combination with a track bolster and a plurality of connected brake levers, of an automatic slack adjuster comprising a casing mounted on said bolster, a toothed member mounted in said casing and operatively connected with one of said levers, a pawl adapted to engage the teeth of said member and operative to move said member forward to take up slack, a pawl for holding said toothed member in adjusted position against movement in one direction, and means on said casing adapted to be engaged by the first mentioned pawl for holding said member in its adjusted position against movement in the opposite direction.

5. The combination with a plurality of brake levers, of an automatic slack adjuster comprising a bar operatively connected with one of said levers and movable forward in the direction of its length to take up slack, ratchet means controlled by the operation of another of said levers for moving said bar forward, a lever for disengaging said ratchet means to permit the backward movement of said bar, and a lever operable manually for operating the disengaging lever.

6. The combination with a plurality of brake levers, of an automatic slack adjuster comprising a bar operatively connected with one of said levers and movable forward in the direction of its length to take up slack, ratchet means controlled by the operation of another of said levers for moving said bar forward, a lever for disengaging said ratchet means to permit the backward movement of said bar, and a manually operable lever for operating and locking the disengaging lever.

7. The combination with a truck bolster capable of limited vertical movement, of an automatic slack adjuster comprising a casing mounted on said bolster, a bar mounted in said casing and adjustable to take up slack, said casing and bar being movable vertically with said bolster, and a brake lever adjustably fulcrumed in said bar to permit movement of the bar relative to said lever in the direction of the length of said lever.

8. The combination with a truck bolster and a plurality of brake levers, of an automatic slack adjuster comprising a casing mounted on said bolster, a toothed bar mounted in said casing and operatively connected with one of said levers, a pawl movable forward upon a release of the brakes to adjust said bar to take up slack, and means for automatically locking said pawl in engagement with said bar when said pawl is in its forward position to prevent accidental forward movement of said bar.

9. The combination with a truck bolster and a plurality of brake levers, of an automatic slack adjuster comprising a casing mounted on said bolster, a toothed bar mounted in said casing and operatively connected with one of said levers, a take up pawl movable forward upon a release of the brakes to engage a tooth of said bar and adjust said bar to take up slack, a holding pawl cooperating with said toothed bar adapted to prevent accidental backward movement of said bar and means on said casing with which said take-up pawl, in its forward adjusting position, is adapted to cooperate to lock said bar against accidental forward movement.

10. The combination with a plurality of brake levers, of an automatic slack adjuster comprising a casing, a bar movably mounted in said casing and operatively connected with one of said levers, ratchet means for adjusting said bar to take up slack, said means comprising a take-up pawl for moving said bar a limited distance in one direction and for preventing the accidental movement of said bar in the same direction and a holding pawl for preventing movement of said bar in the opposite direction, and manually operable means for moving said pawls out of engagement with said bar to permit movement of the bar in either direction.

11. The combination with a plurality of brake levers, of an automatic slack adjuster comprising a movable bar loosely connected intermediate its ends with one of said levers to permit said bar to move in the direction of the length of said lever and relative thereto, and means for adjusting said bar to take up slack.

12. The combination with a plurality of brake levers, of an automatic slack adjuster comprising a movable bar connected intermediate its ends with one of said levers, the connection between said bar and lever being adapted to permit relative movement between said bar and lever in the direction of the length of said lever, and means for adjusting said bar to take up slack.

13. The combination with a plurality of brake levers, of an automatic slack adjuster comprising a movable bar extending beyond the vertical plane of one of said levers and connected to said lever, the connection between said bar and lever being adapted to permit relative movement between said bar and lever in the direction of the length of said lever, and means for adjusting said bar to take up slack.

In testimony whereof I have hereunto set my hand.

CLYDE C. FARMER.